United States Patent [19]

Paris et al.

[11] 4,385,037
[45] May 24, 1983

[54] CONCENTRATED SULPHURIC ACID TREATMENT OF AN ALKYLPHENYL ACID PHOSPHATE EXTRACTANT

[75] Inventors: Sandra L. Paris, Temple Terrace; Alex Magdics, Lakeland; Ralph E. Worthington, Winter Haven, all of Fla.

[73] Assignee: UNC Recovery Corporation, Mulberry, Fla.

[21] Appl. No.: 150,683

[22] Filed: May 16, 1980

[51] Int. Cl.³ .......................................... C01G 43/00
[52] U.S. Cl. .................................. 423/10; 210/634; 423/8
[58] Field of Search ....................... 423/8, 10; 210/634

[56] References Cited

U.S. PATENT DOCUMENTS

| | | | |
|---|---|---|---|
| 2,859,092 | 11/1958 | Bailey et al. | 423/10 |
| 3,835,214 | 2/1974 | Hurst et al. | 423/10 |
| 3,987,145 | 10/1976 | Brauns et al. | 423/10 |
| 4,051,202 | 9/1977 | Arnold | 260/990 |
| 4,059,671 | 11/1977 | Schmieder et al. | 210/634 |
| 4,087,512 | 5/1978 | Reese et al. | 423/321 R |
| 4,258,013 | 3/1981 | Pyrih et al. | 423/10 |
| 4,290,882 | 9/1981 | Dempsey | 423/10 |

FOREIGN PATENT DOCUMENTS 983380  2/1965  United Kingdom ............... 423/10

OTHER PUBLICATIONS

Murphy et al., "Study of Some Phenyl Phosphonic Acids for Extractor of Uranium from Phosphoric Acid," IAEA-SM-135/11, pp. 341-350.

Ellis, "The Recovery of Uranium from Industrial Phosphoric Acids by Solvent Extraction," 78, DOW-81 (1952), Report on Contract AT-30-1-GEW-236.

Hurst et al., *Ind. Eng. Chem. Process Des. Develop*, 13 (#3), 286-191 (1974).

Arnold, Report OHNL-5111, Chemistry Div. Sum. Prog. Report, Period Ending 11-1-74, item 6.7 pp. 55-56 (Feb. 12, 1976).

Arnold, "Uranium Recovery from Wet Process Phosphor Acid with Octyl pheol Acid Phosphate", Abstract of Papers, 172nd ACS National Meeting (San Francisco, 1976), Abs. #40 & paper.

*Primary Examiner*—Edward A. Miller
*Attorney, Agent, or Firm*—Fleit, Jacobson & Cohn

[57] ABSTRACT

Uranium in wet-process phosphoric acid in the tetravalent state is extracted with an alkylphenyl acid phosphate extractant comprising a mixture of mono- and di(alkylphenyl) esters of orthophosphoric acid. The pregnant extractant is stripped with a suitable stripping solution, and the barren extractant recycled to the extractant step. At least a portion of the recycled extractant is treated with concentrated sulphuric acid to remove organic and inorganic impurities including alkylphenol present in the barren extractant as a result of hydrolysis from the mixture of mono- and di-(alkylphenyl) esters of orthophosphoric acid to regenerate the extractant.

25 Claims, 1 Drawing Figure

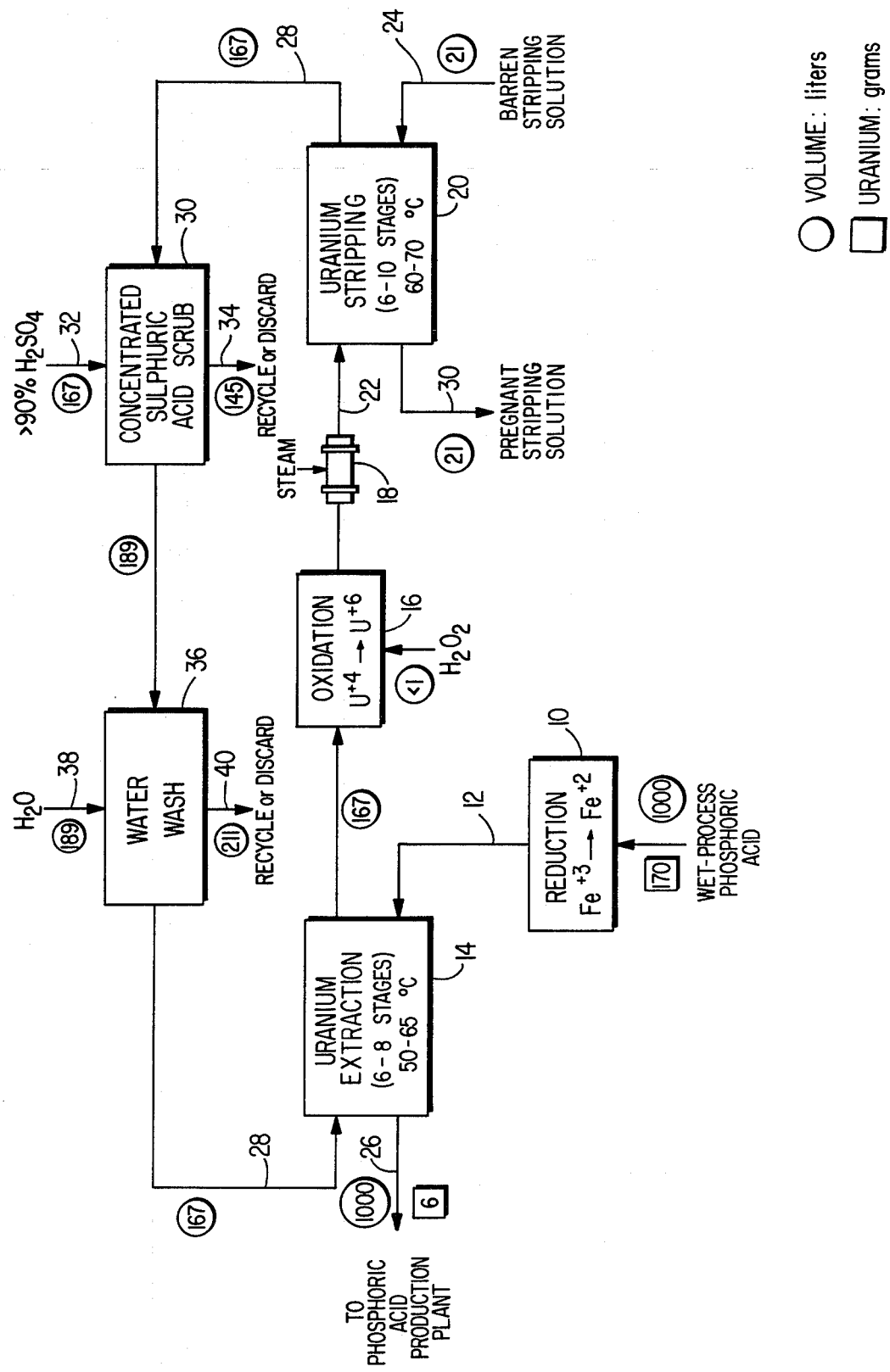

CONCENTRATED SULPHURIC ACID TREATMENT OF AN ALKYLPHENYL ACID PHOSPHATE EXTRACTANT

BACKGROUND OF THE INVENTION

This invention relates to the recovery of uranium from phosphate compounds and, more specifically, to the recovery of uranium from phosphoric acid produced by the acidulation of phosphate rock.

Wet-process phosphoric acid is produced by digesting phosphate rock with sulphuric acid. The chemical reaction forms phosphoric acid and calcium sulfate. The latter is filtered out, providing enormous quantities of gypsum, a waste product, which leaves an impure acid stream typically containing about 30% $P_2O_5$. Most of the uranium in the original rock shows up in the 30% acid, and various extraction processes have been developed to extract this uranium. The 30% acid is generally evaporated to about 54% "merchant acid", which is either sold or used to manufacture a variety of products, chiefly fertilizers. The higher the acid concentration, the harder it is to extract the uranium. Therefore, the 30% stage is where the uranium extraction normally takes place. If the uranium is not extracted, it ends up as a minor impurity in the various end products.

A number of prior processes have been developed to recover the minor amounts of uranium contained in wet-process phosphoric acid. In many of these processes, any hexavalent uranium present in the wet-process acid is first reduced to the tetravalent state and then extracted by contacting the acid with an organic extractant which has a high extraction coefficient (Eå) for uranium in the tatravalent state. The coefficient of extraction (Eå) is a measure of the extraction power of a reagent and is defined as the ratio of the concentration of uranium in the organic phase to the concentration of uranium in the aqueous phase at equilibrium. The pregnant extractant is stripped with a suitable stripping solution, such as phosphoric acid, and the pregnant stripping solution treated to recover the uranium. For example, the pregnant stripping solution may be subjected to a second extraction step to obtain a uranium-rich extractant solution which can be further processed to recover uranium.

Alkylphenyl acid phosphate is a known organic extractant which has a high extraction coefficient for uranium in the tetravalent state. The alkylphenyl acid phosphate extractant is formed by reacting an alkylphenol with phosphoric oxide and comprises a mixture of mono- and di-(alkylphenyl) esters of orthophosphoric acid. The extractant is commercially available as the octylphenyl acid phosphate and is produced commercially at approximately a 1:1 mono- to di-ester mole ratio. While the extractant has a relatively high extraction coefficient for tetravalent uranium, the extractant is known to hydrolyze over extended periods of use to form primarily alkylphenol and phosphoric acid. The hydrolysis not only results in a loss of the extractant, but also causes the mono- to di-ester mole ratio to change since the mono-ester hydrolyzes more rapidly than the di-ester. The change in the mono- to di-ester mole ratio also is caused by the preferential loss of the mono-ester to the wet-process acid over extended periods of use as a result of the relatively higher solubility of the mono-ester in the acid compared to the di-ester. It has previously been reported that the change in the mono- to di-ester mole ratio does not significantly decrease the extraction coefficient in the di-ester mole fraction range of 0.5 to 0.88 based on the total mixed esters present in the extractant. However, as a result of the hydrolysis, the extraction coefficient will eventually decrease and the extractant will become increasingly less effective in extracting uranium from wet-process acid.

As disclosed in commonly assigned, copending application Ser. No. 88,152, filed Oct. 25, 1979, which is a continuation of Ser. No. 772,818, filed Feb. 28, 1977, now abandoned, for "PROCESS FOR EXTRACTING URANIUM FROM WET-PROCESS PHOSPHORIC ACID" by William M. Leaders et al, it may be desirable to add a phenol modifier such as an alkylphenol (e.g., octylphenol) to the extractant to eliminate the precipitation of the ferric salt of the mixed ester. Ferric iron is normally present in wet-process phosphoric acid and is detrimental to the extraction coefficient of the mixed ester. In addition, it will cause the precipitation of the ferric salt of the mixed ester. As disclosed in the aforementioned commonly assigned, copending application, the addition of about 1 to 10% by volume, preferably about 2 to 6% by volume, of a phenol modifier will substantially prevent the loss of the mixed ester as a result of precipitation. It has been found, however, that as a result of a loss of the extractant and an increase in the concentration of the alkylphenol in the extractant due to hydrolysis, the extraction coefficient is actually depressed.

In addition to the chemical changes which occur in the alkylphenyl acid phosphate extractant, physical changes also occur over extended periods of use. The physical changes include viscosity, specific gravity, and solids content increases. While the chemical changes manifest themselves in lower extraction coefficients, the physical changes cause increasingly more pronounced emulsion formations, flow control problems, and overall organic handling difficulties. Therefore, there exists a need in the art for a process to regenerate the extractant.

Accordingly, it is an object of the present invention to provide a process for regenerating an alkylphenyl acid phosphate extractant.

It also is an object of the present invention to provide a process for regenerating an alkylphenyl acid phosphate extractant which is efficient and economical.

It is a further object of the present invention to provide a process whereby the extraction coefficient of the extractant is maintained at an optimum level.

SUMMARY OF THE INVENTION

We have found that an alkylphenyl acid phosphate extractant can be regenerated by treating the extractant with concentrated sulphuric acid. The concentrated sulphuric acid is mixed with the extractant and then the phases allowed to separate. It has been found that the mixture will separate into three distinct layers. The top layer will comprise the diluent for the alkylphenyl acid phosphate extractant. The middle layer will include the octylphenyl acid phosphate extractant and sulphuric acid. The bottom layer will comprise sulphuric acid, essentially all of the alkylphenol present in the extractant, and organic and inorganic impurities. The bottom layer is separated from the other two layers and reused or discarded after neutralization.

The remaining layers are then contacted with water or dilute acid. The contact is accomplished by mixing water or dilute acid with the remaining layers and then allowing the mixture to separate. It has been found that by using this procedure the octylphenyl acid phosphate extractant and its diluent will recombine and form the top layer. The bottom layer will comprise sulphuric acid, residual alkylphenol and sulphonated alkylphenol. The bottom layer is separated from the top layer and reused or discarded after neutralization.

The process described above results in an octylphenyl acid phosphate extractant which contains substantially no alkylphenol. Fresh octylphenyl acid phosphate extractant can then be added to the regenerated extractant solution to make up for any losses of the extractant during regeneration and prior use. Preferably, the fresh extractant has a higher mono- to di-ester mole ratio to maintain an optimum mixture of the mono- and di-esters. Alternatively, the fresh extractant can comprise essentially only the mono-ester. Also, when it is desired to maintain a concentration of alkylphenol in the extractant as a means of preventing the precipitation of the mixed esters, fresh alkylphenol can be added to the regenerated extractant solution in the desired concentration.

The regeneration of the mixed ester extractant also has been found to remove impurities present in the extractant which are transferred to the extractant from the wet-process acid. These impurities include residual humic materials which are separated from the extractant with the sulphuric acid. The regeneration treatment also has been found to reduce the viscosity and specific gravity of the extractant which improves the uranium recovery process by providing better phase disengagement of the organic and aqueous phases during uranium extraction and stripping.

BRIEF DESCRIPTION OF THE DRAWING

The FIGURE shows a flow sheet for the recovery of uranium from wet-process phosphoric acid in which the extractant regeneration treatment in accordance with the present invention is incorporated.

DETAILED DESCRIPTION OF THE PREFERRED EMBODIMENTS

In accordance with the present invention, wet-process phosphoric acid which is obtained by the acidulation of phosphate rock with sulfuric acid and which typically contains about 25–35% $P_2O_5$ is preferably treated to remove solid organic materials, such as humic acids, which interfere with phase separation during uranium extraction. One method of removing the solid organic materials is described in commonly assigned U.S. Pat. No. 4,087,512. The cleaned acid is then treated with a reducing agent, such as iron or some other known reductant, so that any of the uranium in the phosphoric acid that may be in the hexavalent state is reduced to the tetravalent state and ferric iron in the phosphoric acid is reduced to the ferrous state. Since the oxidation state of the iron tends to control the oxidation state of the uranium, substantially all of the uranium in the wet-process acid will be in the reduced tetravalent state, even at relatively high ferric iron concentrations. However, to avoid ferric iron interference with extraction, the ferric iron is preferably reduced such that the ferric iron concentration in the wet-process acid is below 10 grams/liter. This reduction is typically performed in an agitated vessel, preferably in a rotating cylinder, to keep the inorganic solids suspended.

The uranium in the wet-process acid, now in the tetravalent state, is extracted wth an alkylphenyl acid phosphate extractant comprising a mixture of mono- and di-(alkylphenyl) esters of orthophosphoric acid. The preferred mixed esters are prepared from commercially available octylphenol or nonylphenol. The preferred mixture is approximately an equimolar mixture of the mono- and di-esters.

The ester mixture is employed in an inert diluent. Suitable inert diluents include, for example, aliphatic hydrocarbons, aromatic hydrocarbons, aromatic petroleum fractions, and chlorinated hydrocarbons. The preferred diluents are refined high-boiling, high-flash point petroleum fractions containing between 10 and 50% by volume naphthenes with the balance being principally aliphatic. The extractant solution should contain from about 10 to 40% by volume, preferably from about 20 to 30% by volume, of the ester mixture. Greater than 40% by volume solutions of extractant can be used, but may result in poor phase separation. In general, the volume ratio of the wet-process acid to the extractant should be about 5 to 7:1.

In carrying out this extraction step, the mixed ester extractant and the wet-process acid are intimately mixed together and then the phases allowed to separate. This intimate intermixing may be accomplished either in a batch operation or in a continuous manner concurrently or countercurrently, with countercurrent flow being preferred. Apparatus for accomplishing intermixing and separation of two substantially immiscible phases are well-known in the art and any conventional apparatus can be used for this purpose. It is preferred to conduct the extraction in the aqueous continuous mode.

Preferably, the wet-process acid should be maintained at a temperature of about 50° to 65° C. during this extraction step, and also during the prior cleaning and reduction steps described above. By maintaining the wet-process acid at this temperature, impurities such as calcium sulfate are kept in solution which leads to less scale formation in the system and less down time for cleanout being required. After the uranium is extracted, the wet-process acid is returned to the phosphoric acid production plant.

The uranium in the pregnant mixed ester extractant is oxidized and the uranium converted from the tetravalent state to the hexavalent state in the extractant. The preferred oxidizing agent is hydrogen peroxide and is preferably added to the extractant as a 30 to 50% by volume aqueous solution. After the oxidizing agent is added, the extractant is preferably heated to approximately 60° to 70° C. to decrease the extraction coefficient and further enhance the uranium stripping.

In the next step of the process, the mixed ester extractant is stripped of its uranium content. This is accomplished by intimately contacting the extractant with a phosphoric acid stripping solution. The concentration of the stripping solution is generally between about 25 and 35% $P_2O_5$ by weight. It is preferred to use phosphoric acid prepared from elemental phosphorus produced by the direct reduction of ore in the so-called furnace process. The furnace grade or comparable acid is preferred because it is substantially free from solvents and corrosive impurities. In general, the volume ratio of the mixed ester extractant to the stripping solution should be about 6 to 10:1. As in the extraction step, the intimate intermixing of the organic and aqueous phases can be accomplished by techniques and with equipment well-known in the art, either in a batch operation or in a continuous concurrent or countercurrent operation, with the countercurrent system being preferred. Preferably, the stripping operation is accomplished in the aqueous continuous mode using conventional liquid-liquid contact techniques.

As a result of the stripping step, the uranium in the mixed ester extractant is taken up by the stripping solution. The mixed ester extractant withdrawn from the stripping apparatus, now substantially free of its uranium content, is then regenerated prior to being recycled to the extraction step. The pregnant phosphoric acid stripping solution, after being separated from the mixed ester extractant, typically contains from about 5 to 10 grams of uranium in the hexavalent state per liter of strip acid. The stripping solution may then be treated to recover the uranium. For example, the stripping solution may be subjected to a second extraction and stripping cycle to produce a product containing high purity $U_3O_8$, such as disclosed in U.S. Pat. No. 3,835,214 to Hurst et al.

The mixed ester extractant is regenerated by treating the extractant with concentrated sulphuric acid. The term "concentrated sulphuric acid" as used herein is intended to refer to an aqueous sulphuric acid solution having a concentration above about 90% $H_2SO_4$. The preferred sulphuric acid concentration is about 94 to 98% $H_2SO_4$. Sulphuric acid in this concentration is available commercially or can be prepared by dilution or concentration of commercially available grades of sulphuric acid.

In carrying out the regeneration, the mixed ester extractant and the concentrated sulphuric acid are intimately mixed together and then the phases allowed to separate. This intimate intermixing can be accomplished either in a batch operation or in a continuous manner concurrently or countercurrently. Any conventional apparatus for accomplishing intermixing and separation of two substantially immiscible phases can be used for this purpose. Preferably, the mixed ester extractant and the concentrated sulphuric acid should be maintained at a temperature of about 30° to 100° C., preferably about 40° to 70° C., during this regeneration step. In general, the volume ratio of the mixed ester extractant to the concentrated sulphuric acid should be about 1 to 5:1, preferably about 1 to 2:1. A contact time of about 5 to 60 minutes, preferably about 10 to 20 minutes, is sufficient prior to allowing the phases to separate.

The phases are then allowed to separate and will form, upon separation, three distinct layers. A typical break rate for the separation is about 0.1 inch/minute. The top layer will comprise the diluent for the mixed ester extractant. The middle layer includes the mixed ester extractant and sulphuric acid. The bottom layer will comprise sulphuric acid, alkylphenol either formed as a result of hydrolysis of the extractant or initially added to the extractant as a modifier, sulphonated alkylphenol and organic and inorganic impurities. The bottom layer is reused if it still has a suitable concentration or is neutralized and then discarded.

The remaining two layers are then contacted with water or dilute mineral acid, such as about 20 to 30% sulphuric acid. The contact is preferably performed in an agitated vessel by adding the water or dilute acid directly to the two remaining layers. The quantity of water or dilute acid added to the two remaining layers should be sufficient to reduce the concentration of the sulphuric acid to about below 60% $H_2SO_4$, preferably about 25 to 35% $H_2SO_4$. Since the corrosion properties of dilute sulphuric acid are different from concentrated sulphuric acid, the water or dilute mineral acid wash should be carried out in a different corrosion-resistant reaction vessel from the concentrated sulphuric acid scrub.

The water or dilute mineral acid wash is conducted at a temperature of about 0° to 100° C., preferably about 30° to 60° C. In general, the volume ratio of the water or dilute mineral acid to the two remaining layers should be about 1 to 5:1, preferably about 1 to 2:1. A contact period of about 1 to 20 minutes is sufficient prior to allowing the phases to separate, with a time period of about 5 to 15 minutes being generally preferred.

The phases resulting from the water wash will separate into two layers. A typical break rate for the separation is about 0.5 to 1 inch/minute. The top layer will comprise the mixed ester extractant now recombined with its diluent. The bottom layer will include sulphuric acid, residual alkylphenol, and sulphonated alkylphenol. The bottom layer is reused if it still has a suitable concentration or is neutralized and then discarded.

The regeneration of the extractant by treatment with concentrated sulphuric acid is generally used in combination with the addition of fresh extractant to make up for any losses of the extractant and to maintain an optimum mixture of the mixed esters. In accordance with one embodiment of the invention, fresh extractant with a higher mono- to di-ester mole ratio is added to the extractant. The fresh extractant having the higher mono- to di-ester mole ratio, typically about 2:1, can be formed by reacting about 0.17 to 0.5 mole, preferably about 0.33 to 0.66 mole, most preferably about 0.33 to 0.5 mole, of phosphoric oxide ($P_4O_{10}$) with each mole of alkylphenol. Alternatively, the fresh extractant can comprise essentially only the mono-ester. Although the reaction of phosphoric oxide with alkylphenol forms a mixture of the mono- and di-esters, methods for separating the mixture into the individual components are known in the art as disclosed, for example, in U.S. Pat. No. 4,051,202. A sufficient amount of fresh extractant should be added to the extractant to maintain the mole fraction of the mono-ester in the extractant from about 0.3 to 0.5 and, more preferably, to maintain an approximately equimolar mixture of the mono- and di-esters.

It is also preferred to maintain sufficient alkylphenol in the extractant to act as a modifier to prevent the precipitation of the ferric salt of the extractant as disclosed in the aforementioned commonly assigned, co-pending application Ser. No. 88,152 by William M. Leaders et al. Accordingly, alkylphenol in a concentration of about 1 to 10% by volume, preferably about 2 to 6% by volume, should be added to the regenerated mixed ester extractant to act as a modifier to prevent the precipitation of the ferric salt of the extractant. Preferably, the extractant solution should contain about 2% by volume modifier at 20% by volume of mixed esters and the volume of modifier should be increased by about 1% as the volume of the mixed esters is increased by about 5% (e.g., 4% by volume modifier at 30% by volume mixed esters). The preferred modifiers are nonylphenol and octylphenol which are both commercially available. The commercially available octylphenol is para-1,1,3,3 tetramethyl butyl phenol.

In order to facilitate an easier understanding of the present invention, a flow sheet illustrating the process is provided in the FIGURE. Wet-process phosphoric acid, preferably treated to remove a substantial portion of its solid organic material content as described in U.S. Pat. No. 4,087,510, is introduced into reduction unit 10.

The wet-process acid, now containing uranium primarily in the tetravalent state and impurities such as iron primarily in reduced oxidation states, is introduced via line 12 into countercurrent uranium extraction unit 14 having six to eight stages, while alkylphenol acid phosphate extractant comprising an approximately equimolar mixture of mono- and di-(octyl-or nonylphenyl) esters of orthophosphoric acid in an inert diluent is introduced into the extraction unit 14 via recycle line 28. After extraction, the extractant, now rich in uranium, is oxidized in oxidation unit 16, heated in heat exchanger 18 and then introduced into countercurrent uranium stripping unit 20 having six to ten stages via line 22, while phosphoric acid is introduced into the unit via line 24. Extracted wet-process acid is removed from the uranium recovery system via line 26 and returned to the phosphoric acid production plant to be evaporated to 54% "merchant acid". After being stripped of its uranium content, the mixed ester extractant from uranium stripping unit 20 is recycled to uranium extraction unit 14 via recycle line 28. Uranium-rich stripping solution from stripping unit 20 leaves via line 30. This stripping solution may be further treated to recover the uranium contained therein.

To regenerate the barren extractant, the recycled extractant is fed to concentrated sulphuric acid scrub unit 30. Concentrated sulphuric acid is added to scrub unit 30 via line 32. The concentrated sulphuric acid and recycled extractant are mixed together and then the phases allowed to separate to form three layers. The bottom layer, which comprises sulphuric acid now diluted in concentration, alkylphenol, sulphonated alkylphenol, and organic and inorganic impurities is removed from the scrub unit 30 via line 34 and reused if it still has a suitable concentration or discarded after neutralization. The remaining two layers are then fed via recycle line 28 to water wash unit 36. Water or dilute mineral acid is added to wash unit 36 via line 38. The water or dilute mineral acid and the remaining two layers from scrub unit 30 are mixed together and then allowed to separate into two layers. The bottom layer, which comprises dilute sulphuric acid, residual alkylphenol and sulphonated alkylphenol is removed from the wash unit 36 via line 40 and reused or discarded. The top layer, which comprises the mixed ester extractant recombined with its diluent, is then fed via recycle line 28 to uranium extraction unit 14. Fresh extractant and alkylphenol, as desired, are added to the barren organic extractant downstream of water wash unit 36 and upstream of uranium extraction unit 14.

To facilitate an understanding of the advantages and operation of the present invention, the following example is provided to illustrate the present process and its intended advantages. Also, to further facilitate an understanding of the overall uranium recovery process, typical relative volume flows and uranium concentrations are shown in the figure enclosed in circles and squares, respectively.

EXAMPLE

An extractant comprising an approximately equimolar mixture of mono- and di-(octylphenyl) esters of orthophosphoric acid (MOPAP+DOPAP, respectively) in kerosene having an octylphenol (OP) modifier added thereto was passed through a cyclic, countercurrent uranium extraction and stripping operation in which the extractant was contacted with wet-process phosphoric acid to extract uranium, the uranium in the pregnant extractant was oxidized with hydrogen peroxide, and the pregnant extractant was stripped with a phosphoric acid stripping solution prior to recycle. A portion of the barren extractant was regenerated by mixing the barren extractant with 98% $H_2SO_4$ at an A/O of 1 at 25° C. and then allowing the phases to separate into three layers, each of which was analyzed. The bottom layer was then discarded and the two top layers mixed with nondistilled $H_2O$ at an A/O of 1 at 25° C. The top layer of the two phases which resulted from the separation of the mixture was analyzed and the bottom layer discarded. The analysis of the various layers and the starting extractant prior to regeneration is set forth below:

| Description | Appearance | Viscosity (cs) | Sp. Gr. | % wt/v MOPAP | DOPAP | OP | Eä |
|---|---|---|---|---|---|---|---|
| A. Starting Extractant | Black, viscous | 9.20 | .896 | 2.7 | 10.9 | 8.1 | 1.9 |
| B. Layers After $H_2SO_4$ Scrub | | | | | | | |
| 1. Top Layer (e.g., Kerosene) | Clear, caramel colored | 1.44 | .785 | Nil | Nil | Nil | — |
| 2. Middle Phase (e.g., OPAP Esters) | Black, syrup-like | ~50 | ~1.4 | 5.7 | 19.3 | Nil | — |
| 3. Bottom Phase (e.g., $H_2SO_4$) | Black, viscous | >9.5 | >1.7 | Nil | Nil | * | — |
| C. Top Layer After $H_2O$ Wash | Dark brown, fluid | 3.10 | .848 | 2.7 | 13.5 | Nil | 19.3 |

*OP assumed to be either in the $H_2SO_4$ and/or the water wash.

As will be readily understood by those of ordinary skill in the art, minor modifications may be made in the invention described above without in any way departing from the spirit and scope of the invention. Accordingly, it is understood that the invention will not be limited to the exact details disclosed hereinbefore, but will be defined in accordance with the appended claims.

We claim:

1. A process for regenerating an extractant including a mixture of mono- and di-(alkylphenyl) esters of orthophosphoric acid comprising contacting at least a portion of the extractant with concentrated sulphuric acid to remove organic and inorganic impurities from the mixture of mono- and di-(alkylphenyl) esters of orthophosphoric acid.

2. The process of claim 1 wherein the extractant comprises a mixture of mono- and di-(alkylphenyl) esters of orthophosphoric acid and the extractant contains alkylphenol.

3. The process of claim 1 wherein the concentrated sulphuric acid is mixed with the extractant at a temperature of about 30° to 100° C. for from 5 to 60 minutes and the resulting phases then allowed to separate.

4. The process of claim 3 wherein the concentrated sulphuric acid is mixed with the extractant at an O:A of about 1 to 5:1.

5. The process of claim 3 wherein the resulting phases separate into three layers and the bottom layer is separated from the two remaining layers.

6. The process of claim 5 in which the two remaining layers are scrubbed with water or a dilute mineral acid at a temperature of about 0° to 100° C. for about 1 to 20 minutes and the resulting phases allowed to separate.

7. The process of claim 6 wherein the resulting phases separate into two layers and the bottom layer is separated from the top layer.

8. The process of claim 7 wherein the fresh extractant is added to the top layer to make-up for losses of the extractant.

9. In a process for recovering uranium from wet-process phosphoric acid including extracting the uranium from the wet-process phosphoric acid with an extractant including a mixture of mono- and di-(alkylphenyl) esters of orthophosphoric acid dissolved in a diluent, stripping the uranium from the extractant with a stripping solution, and recycling barren extractant to the extraction step in which the extractant undergoes hydrolysis to form alkylphenol, the improvement comprising contacting at least a portion of the recycled barren extractant with concentrated sulphuric acid to remove the alkylphenol from the mixture of mono- and di-(alkylphenyl) esters of orthophosphoric acid to thereby regenerate the extractant.

10. The process of claim 9 wherein the extractant comprises a mixture of mono- and di-(octylphenyl) esters of orthophosphoric acid and the alkylphenol is octylphenol.

11. The process of claim 9 wherein the diluent is kerosene.

12. The process of claim 9 wherein the concentrated sulphuric acid is mixed with the extractant at a temperature of about 40° to 70° C. for from 10 to 20 minutes and the resulting phases then allowed to separate.

13. The process of claim 12 wherein the concentrated sulphuric acid is mixed with the extractant at an 0:A of about 1 to 2:1.

14. The process of claim 12 wherein the resulting phases separate into three layers and the bottom layer is separated from the two remaining layers.

15. The process of claim 14 in which the two remaining layers are scrubbed with water or a dilute mineral acid at a temperature of about 30° to 60° C. for about 5 to 15 minutes and the resulting phases allowed to separate.

16. The process of claim 15 wherein the resulting phases separate into two layers and the bottom layer is separated from the top layer.

17. In a process for recovering uranium from wet-process phosphoric acid including extracting the uranium from the wet-process phosphoric acid with an extractant including a mixture of mono- and di-(alkylphenyl) esters of orthophosphoric acid dissolved in a diluent, stripping the uranium from the extractant with a stripping solution, and recycling barren extractant to the extraction step in which the extractant undergoes hydrolysis to form alkylphenol, the improvement comprising contacting at least a portion of the recycled barren extractant with sulphuric acid having a concentration of about 94 to 98% $H_2SO_4$ to form a first mixture which separates into three layers, separating the bottom layer from the upper and middle layers, and contacting the upper and middle layers with water or a dilute mineral acid to form a second mixture which separates into two layers the upper one of which is the extractant substantially free from the alkylphenol.

18. The process of claim 17 wherein the extractant comprises a mixture of mono- and di-(octylphenyl) esters of orthophosphoric acid and the alkylphenol is octylphenol.

19. The process of claim 17 wherein the sulphuric acid is contacted with the recycled barren extractant at a temperature of about 40° to 70° C. for 10 to 20 minutes to form the first mixture, and the upper and middle layers resulting from the first mixture are contacted with water or a dilute mineral acid for about 30° to 60° C. for about 5 to 15 minutes to form the second mixture.

20. In a process for recovering uranium from wet-process phosphoric acid including extracting the uranium from the wet-process phosphoric acid with an extractant including a mixture of mono- and di-(alkylphenyl) esters of orthophosphoric acid dissolved in a diluent and being modified to include from about 1 to 10% by volume of an alkylphenol to substantially prevent precipitation of the extractant, stripping the uranium from the extractant with a stripping solution, and recycling barren extractant to the extraction step in which the extractant undergoes hydrolysis to form alkylphenol, the improvement comprising contacting at least a portion of the recycled barren extractant with concentrated sulphuric acid to remove the alkylphenol present in the extractant as a result of hydrolysis from the mixture of mono- and di-(alkylphenyl) esters of orthophosphoric acid and diluent, and adding fresh alkylphenol to the resulting extractant mixture.

21. The process of claim 20 wherein the fresh extractant is a mixture of mono- and di-(alkylphenyl) esters having a mono- to di-ester mole ratio above 1:1.

22. The process of claim 20 wherein the extractant comprises a mixture of mono- and di-(octylphenyl) esters of orthophosphoric acid and the alkylphenol is octylphenol.

23. The process of claim 20 wherein the concentrated sulphuric acid is contacted with the recycled barren extractant at about 40° to 70° C. for about 10 to 20 minutes and the resulting phases are then allowed to separate.

24. The process of claim 23 wherein the resulting phases separate into three layers, the bottom layer is separated, and the remaining two layers are subjected to a water or dilute mineral acid scrub.

25. The process of claim 24 wherein the water or dilute mineral acid scrub forms two layers, the bottom layer is separated, and the fresh alkylphenol is added to the top layer.

* * * * *